US007738569B2

(12) United States Patent
Quinn et al.

(10) Patent No.: US 7,738,569 B2
(45) Date of Patent: Jun. 15, 2010

(54) ULTRA-WIDEBAND (UWB) SECURE WIRELESS DEVICE PAIRING AND ASSOCIATED SYSTEMS

(75) Inventors: Liam B. Quinn, Austin, TX (US); Douglas M. Anson, Dripping Springs, TX (US); William Dale Todd Nix, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1094 days.

(21) Appl. No.: 11/403,297

(22) Filed: Apr. 13, 2006

(65) Prior Publication Data

US 2007/0242729 A1 Oct. 18, 2007

(51) Int. Cl.
*H04L 27/00* (2006.01)
*H04L 23/00* (2006.01)
(52) U.S. Cl. ...................... 375/259; 375/377
(58) Field of Classification Search ................. 375/130, 375/259, 295, 377; 379/142.05; 380/247; 455/411; 713/176; 726/1, 14, 15; 370/252, 370/282, 507; 709/237
See application file for complete search history.

(56) References Cited

U.S. PATENT DOCUMENTS

| | | | | |
|---|---|---|---|---|
| 4,200,770 | A | 4/1980 | Hellman et al. ............... 178/22 |
| 6,772,331 | B1 | 8/2004 | Hind et al. .................. 713/151 |
| 6,819,245 | B1 | 11/2004 | Dilling .................... 340/572.1 |
| 6,886,095 | B1 | 4/2005 | Hind et al. .................. 713/168 |
| 6,961,541 | B2 * | 11/2005 | Overy et al. ................ 455/41.2 |
| 6,980,660 | B1 | 12/2005 | Hind et al. .................. 380/282 |
| 7,174,130 | B2 | 2/2007 | Kurisko et al. ............. 455/41.2 |
| 7,254,367 | B2 | 8/2007 | Helden et al. .............. 455/41.2 |
| 2003/0050009 | A1 | 3/2003 | Kurisko et al. ................ 455/41 |
| 2003/0115415 | A1 * | 6/2003 | Want et al. ................... 711/115 |
| 2004/0203600 | A1 * | 10/2004 | McCorkle et al. ........... 455/411 |
| 2005/0026596 | A1 * | 2/2005 | Markovitz .................... 455/411 |
| 2005/0286610 | A1 * | 12/2005 | Dowla et al. ................ 375/130 |
| 2006/0083187 | A1 | 4/2006 | Dekel .......................... 370/310 |
| 2006/0116107 | A1 | 6/2006 | Hulvey ........................ 455/411 |
| 2006/0120433 | A1 * | 6/2006 | Baker et al. ................. 375/130 |
| 2006/0135064 | A1 | 6/2006 | Cho et al. .................. 455/41.1 |
| 2006/0143455 | A1 | 6/2006 | Gitzinger .................... 713/170 |
| 2006/0198448 | A1 * | 9/2006 | Aissi et al. .................. 375/259 |
| 2006/0205354 | A1 | 9/2006 | Pirzada et al. ............. 455/66.1 |
| 2006/0239217 | A1 * | 10/2006 | Hassan et al. .............. 370/311 |
| 2007/0051808 | A1 * | 3/2007 | Adams et al. ............... 235/451 |
| 2007/0053313 | A1 * | 3/2007 | Adams et al. ............... 370/315 |

(Continued)

OTHER PUBLICATIONS

Intel®, "*Wireless USB, The First High-Speed Personal Wireless Interconnect*," 2005.

(Continued)

*Primary Examiner*—Tesfaldet Bocure
*Assistant Examiner*—Lawrence B Williams
(74) *Attorney, Agent, or Firm*—O'Keefe, Egan, Peterman & Enders, LLP

(57) ABSTRACT

Methods and systems are disclosed for ultra-wideband (UWB) secure wireless device pairing. Secure pairing between devices for secure UWB communications is conducted over in-band UWB communications to provide secure pairing without requiring a visual confirmation through a graphical user interface (GUI), in particular, for wireless personal area network (WPAN) communications. The secure in-band pairing of wireless UWB devices over a UWB radio link provides considerable advantages over prior secure pairing techniques.

14 Claims, 3 Drawing Sheets

U.S. PATENT DOCUMENTS

2007/0066307 A1* 3/2007 Brown et al. ............... 455/445
2007/0076879 A1* 4/2007 Asokan et al. ............. 380/255
2010/0005294 A1* 1/2010 Kostiainen et al. ......... 713/168

OTHER PUBLICATIONS

Intel®, "*Ultra-Wideband (UWB Technology), Enabling High-Speed Wireless Personal Area Networks*," 2005.

Michael Scott, *Efficient Short-Password Key Exchange and Login Protocols*,: Sep. 20, 2001, School of Computer Applications, Dublin City University, Ireland.

Wireless Universal Serial Bus Specifications Supplement, *Association Models Supplement to the Certified Wireless Universal Serial Bus Specification*, Mar. 2, 2006, Revision 1.0.

Preston Hunt, Wireless Certified USB™, "*Wireless USB Association Models*," 2005 Intel Corp.

"*Wireless Universal Serial Bus Specification*," May 12, 2005, Revision 1.0.

* cited by examiner

ULTRA-WIDEBAND (UWB) SECURE WIRELESS DEVICE PAIRING AND ASSOCIATED SYSTEMS

TECHNICAL FIELD OF THE INVENTION

This invention relates to techniques for secure device pairing for ultra-wideband (UWB) communication systems and, more particularly, to securing wireless personal area network (WPAN) communications between two or more personal devices.

BACKGROUND

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems utilize wireless communications to communicate with each other. In addition, certain information handling systems, such as desktop and portable computer systems, utilize wireless personal area network (WPAN) communications to interface with portable devices and peripherals, such as personal digital assistants (PDAs), cellular telephones, printers and other devices. Typically, a WPAN is used for short range wireless communications generally in single digit meters of range and usually intra-room. In contrast, WiFi communications or wireless LAN (local area network) communications are typically used for longer range wireless communications generally in double digit meters of range and often inter-room. Blue Tooth (BT) is an example communication protocol and interface standard that is in use today for short range WPAN device communications. In addition, devices have used direct wired connections, for example, through USB (universal serial buss) connections, to allow for communications between personal electronic devices and desktop/portable computer systems. These wireless and/or wired communications, for example, can allow PDAs to synchronize with software applications running on desktop and/or portable computer systems.

Ultra-wideband (UWB) is currently being considered as an alternative to other short range communication protocols, such as Blue Tooth, and direct cable communications, such as through USB connections. Ultra-wideband (UWB) is typically used to refer to a wireless communications technology that can currently transmit data at speeds between about 40 to 60 megabits per second and possibly up to 1 gigabit per second and beyond. UWB devices are typically configured to transmit ultra-low power radio signals with very short electrical pulses, often in the picosecond (1/1000th of a nanosecond) range, across a very wide range of frequencies at once. UWB receivers must translate these short bursts of noise into data by listening for a familiar pulse sequence sent by the transmitter. Because of its low power requirements, UWB is very difficult to detect and therefore difficult to regulate. Because it spans the entire frequency spectrum (licensed and unlicensed), it can be used indoors and underground and is a promising technology for wireless communications. UWB is also advantageous because it offers very low interference with traditional wireless technologies (e.g., WiFi, BT, etc.). A UWB device, as used herein, includes any information handling system that is capable of communicating through UWB communications.

Security is one significant concern with respect to such wireless communications. It is not only desirable for the communications to be secured in some fashion, but it is also desirable for the identity of the devices themselves to be verifiable. In other words, before a secure communication link is established, the communicating devices preferably have a secure mechanism to verify the identity of the device to which it will be communicating. Secure device pairing is one method for making sure device identities are verified in a secure manner prior to opening a communication link.

Secure device paring involves creating a strong shared secret known only to each entity in the pair. The strong shared secret (key) is used to create confidentiality over the pairing channel. Currently, publicly available protocols are available to meet this requirement. For example, known Diffie-Hellman (DH) key exchange protocols and/or modified DH key exchange protocols can be utilized to create a strong shared secret for the pairing. One modified DH key exchange protocol involves key mixing in an effort to mitigate the known man-in-the-middle weakness of stock DH key exchanges. Example DH protocol information can be found in U.S. Pat. No. 4,200,770, which is hereby incorporated by reference in its entirety.

The emergence of high speed, high bandwidth UWB as a WPAN cable replacement technology presents the challenge of allowing for secure peripheral device pairing and authentication without adding undue complexity and cost. As stated above, secured pairing allows one or both of the devices to have one or more pairing secrets that can be used to confirm the identity of the other device. One method currently proposed by the UWB development industry requires initial configuration using a physically connected cable for secure pairing of the two devices. Once the trusted devices have generated pairing secrets through the physical link, the devices transition to operation over a wireless UWB link. Another proposed technique for UWB secure device pairing includes the addition of near-field communication radios (NFCs) within the devices that can be used for the secure pairing before handing off the devices to communicate over a UWB transport link. A further proposed technique for UWB secure device pairing includes the use of graphical depictions of numerical codes on each device that must be verified and confirmed to match by a user through graphical user interfaces (GUIs) of the devices. These approaches (physical link, NFC radio, visual match confirmation) add unnecessary cost and redundant complexity to secure pairing of UWB capable wireless devices.

SUMMARY OF THE INVENTION

The present invention provides ultra-wideband (UWB) secure wireless device pairing and associated systems. According to the present invention, secure pairing between devices for secure UWB communications can be conducted over in-band UWB communications without requiring visual match confirmations through graphical user interfaces (GUIs). The present invention is particularly suited for secure pairing activities in wireless personal area network (WPAN) communications. The secure in-band pairing of wireless UWB devices over a UWB radio link of the present invention provides considerable advantages. While UWB pairing solutions have been proposed that use external means such as cables, access codes or visual numerical match confirmations, the present invention provides automated processes and eliminates the cost of requiring a physical cable and adds useful security mechanisms on top of an in-band pairing scheme.

In one aspect, the present invention can be a method for secure pairing of two or more ultra-wideband (UWB) devices including initiating device discovery with at least a first UWB device, conducting automatically secure pairing between the first UWB device and a second UWB device over in-band UWB communications, and generating automatically one or more pairing secrets for subsequent UWB communications between the first and second UWB devices. The conducting and generating steps are performed without requiring a visual match confirmation through graphical user interfaces (GUIs) of the first and second UWB devices. In addition, the initiating step can be performed manually or automatically, as desired, and a low power mode for UWB communications can be used for secure pairing. Still further, the method can include using pre-existing device or vendor-injected information to generate the pairing secrets, and the method can include using a key exchange protocol to create the pairing secret based at least in part upon a Diffie-Hellman key exchange protocol. As described below, other features and variations can be implemented, if desired, and related systems can be utilized, as well.

In another aspect, the present invention can be a secure pairing system for two or more ultra-wideband (UWB) devices, including a first UWB device having an automated secure pairing module and a UWB communication interface and a second UWB device having an automated secure pairing module and a UWB communication interface. The first UWB device is configured to conduct automatically secure pairing with at least one other UWB device over in-band UWB communications without requiring a visual match confirmation through a graphical user interface (GUI). And the second UWB device is configured to conduct automatically secure pairing with at least one other UWB device over in-band UWB communications without requiring a visual match confirmation through a graphical user interface (GUI). In addition, the first or the second UWB device can be configured to have secure pairing manually initiated through its GUI. Further, the first or the second UWB device can be configured to initiate automatically secure pairing. Still further, the first and second UWB devices can be configured to use pre-existing device or vendor-injected information to generate pairing secrets. A low power mode for UWB communications can also be used for secure pairing. As described below, other features and variations can be implemented, if desired, and related methods can be utilized, as well.

In a further respect, the present invention can be an ultra-wideband (UWB) device having automated in-band secure pairing including a UWB communication interface and an automated secure pairing module configured to conduct automatically secure pairing with at least one other UWB device over in-band UWB communications without requiring a visual match confirmation through a graphical user interface (GUI). The UWB device can also include a graphical user interface (GUI) such that the automated pairing module being configured to provide secure pairing feedback information to a user through the GUI. Still further, the UWB device can be configured to use a low power mode for UWB communications in secure pairing, and the UWB device can be configured to use pre-existing device or vendor-injected information to generate pairing secrets. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
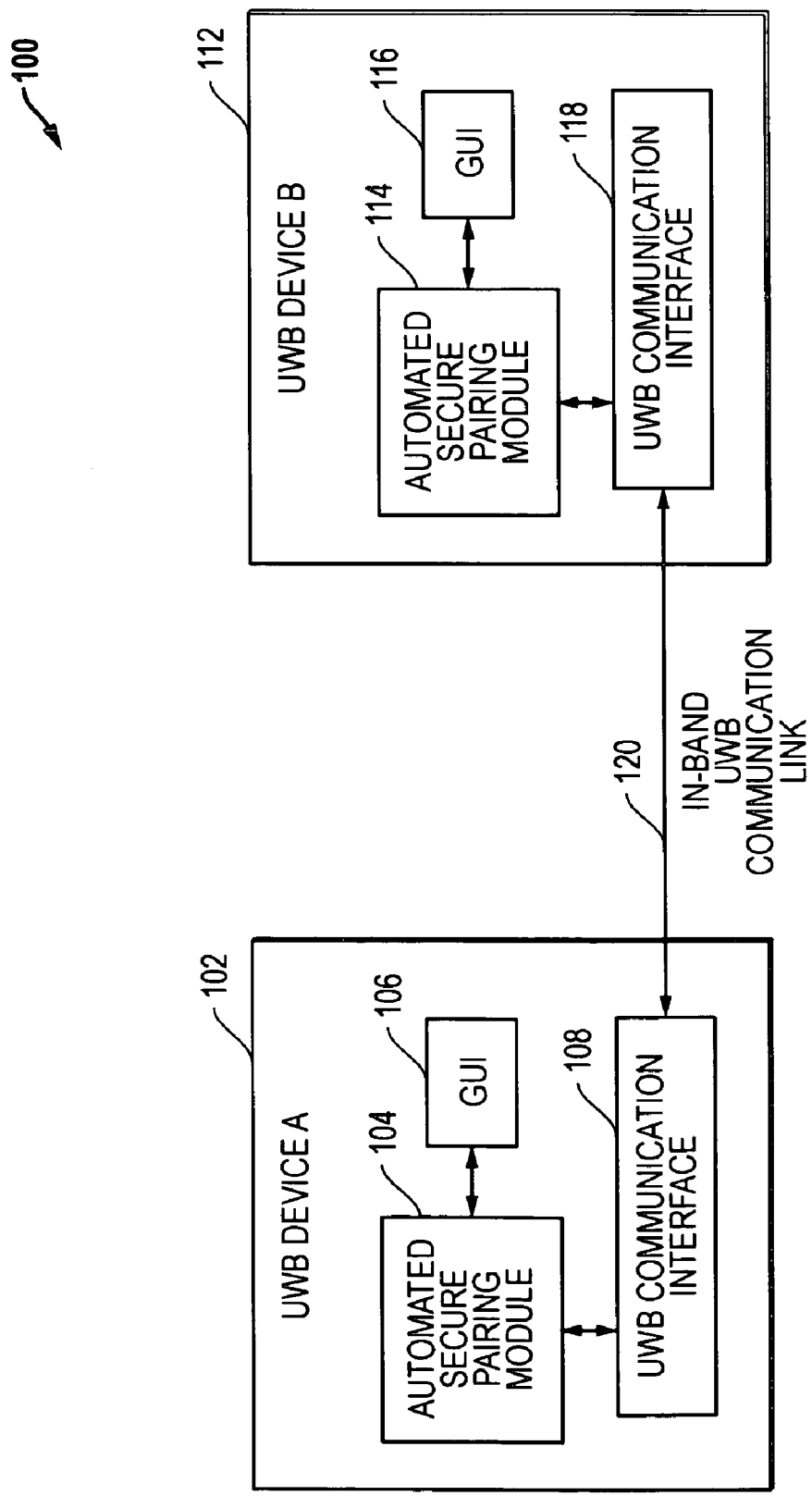
FIG. 1 is a block diagram for a secure pairing system including two ultra-wideband (UWB) devices having automated secure pairing modules according to the present invention to allow for secure pairing communications across an in-band UWB communication link.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention relates to secure pairing between two or more information handling systems that are configured to communicate using ultra-wideband (UWB) communication links. According to the present invention, secure pairing between devices for secure UWB communications is conducted over in-band UWB communications, in particular, for secure pairing in wireless personal area network (WPAN) communications. The secure in-band pairing of wireless UWB devices over a UWB radio link of the present invention provides considerable advantages. While out-of-band UWB pairing solutions have been proposed that use external means such as cables and access codes, the automated processes of the present invention eliminate the cost of requiring a physical cable and adds useful security mechanisms on top of an in-band pairing scheme.

As described in more detail below, the present invention in part provides a two-phased architecture model to configure the UWB wireless devices intended for pairing. Phase one is a discovery mode in which UWB radio transmit power is set into a very low power state with reduced bandwidth and very short (near-field) range. Although optional, this low power mode allows for increased security and lowers the risk of an undesired device intercepting the secure pairing communications. Phase two is a handshake phase in which transmission of a pairing beacon code is initiated. This beacon code is transmitted over the air preferably in the low power mode and preferably near-physical-locality state. If a device detects more than one beacon code, then the device may elect to pair with the first discovered device or fail due to the conflict. When two devices successfully exchange the handshake beacon code of the other, the two devices can transition to the verification and secure pairing phase.

With respect to secure pairing, existing device pairing techniques can be utilized. As discussed above, Diffie-Hellman (DH) key exchange protocols and modified DH key exchange protocols are examples of existing secure pairing protocols. Key exchange and verification for the present invention can, therefore, utilize DH and modified-DH protocols. Example DH protocol information can be found in U.S. Pat. No. 4,200,770, which is hereby incorporated by reference in its entirety. Other key exchange protocols could also be utilized, if desired, separately or in conjunction in order to help provide secure pairing.

According to the present invention, during the initial secure pairing phase (such as the DH exchange), each UWB device in the pairing negotiation can make use of pre-existing device-specific or device-generated information such as, for example:

UWB device ID
random number
secret nonce in establishing the initial DH secret
vendor-supplied information
other device-known or device-generated information Using this existing device information, the present invention provides an automated technique for establishing the initial pairing secret. Alternatively, preset shared secrets can be set up for the UWB devices and then used for automated secure pairing. In addition, as indicated above, a vendor could supply or inject information for the device that would be used for automated pairing. In short, the secure pairing is automated by using unique pre-existing information related to the device rather than hard-wired connections between devices and/or keys or personal identification numbers (PINs) that must be manually entered by a user. It is noted, however, that one of these prior less efficient techniques could be used in conjunction with the automated techniques of the present invention, if desired.

If the DH key exchange fails, the devices can reattempt pairing a specified number of times before a failure is deemed final. Other error and failure handling mechanisms could also be utilized, as desired. After successful secure pairing of the UWB devices, UWB communications can be secured using the pairing secrets established during the secure pairing exchange. Initially, the pairing secrets or keys can be used to verify identity through one-way or two-way challenges (e.g., A challenge B, B challenge A, or both challenge the other). If the key verification fails, a retry limit can be applied such that verification fails if verification cannot be established within a specified number of tries.

Figure 2:
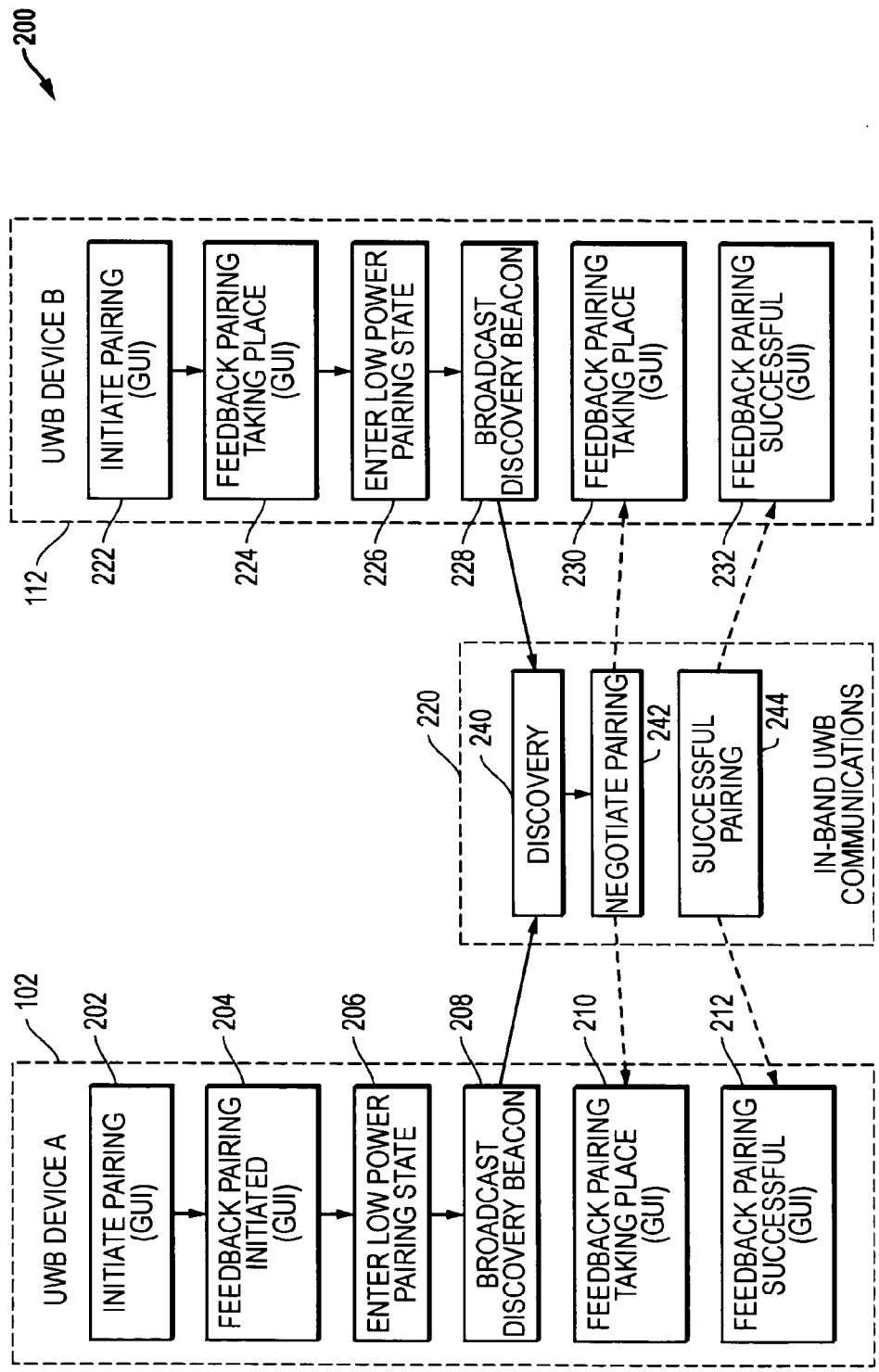
FIG. 2 is a flow diagram for secure pairing interactions between two UWB devices having automated secure pairing modules according to the present invention.
Figure 3:
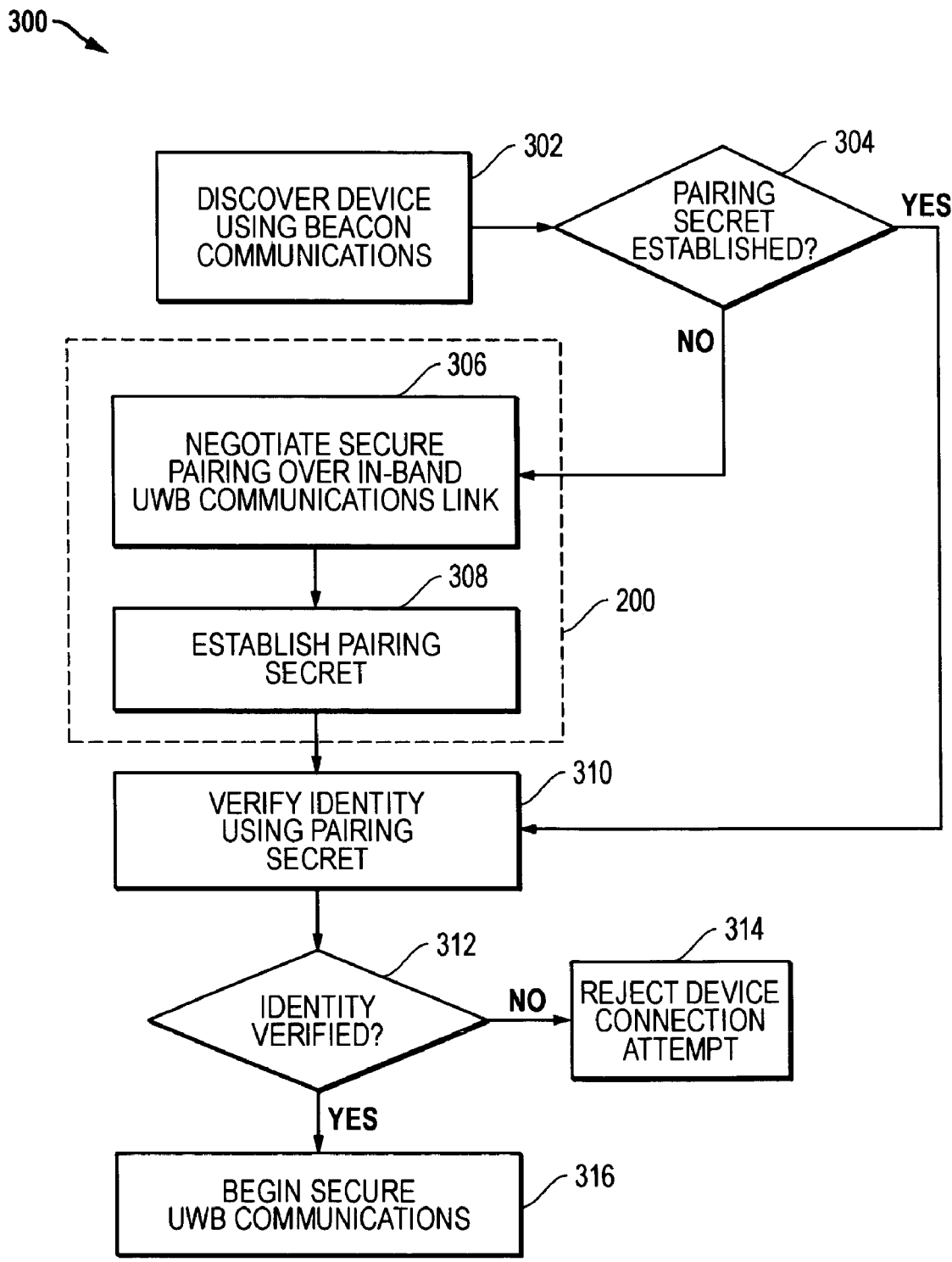
FIG. 3 is a flow diagram for UWB communications between two ultra-wideband (UWB) devices according to the present invention.

The present invention will now be described in further detail with respect to the drawings. FIG. 1 provides an example block diagram for a secure pairing system with two UWB devices. FIG. 2 provides an example flow diagram for automated secure pairing according to the present invention. And FIG. 3 provides an example flow diagram for UWB communications utilizing automated secure pairing according to the present invention.

Looking first to FIG. 1, a block diagram is depicted for a secure pairing system 100 in a wireless personal area network (WPAN) system environment according to the present invention. As depicted, two ultra-wideband (UWB) devices 102 and 112 include automated secure pairing modules 104 an 114, respectively, to allow for secure pairing communications across an in-band UWB communication link 120. In particular, the first UWB device (UWB DEVICE A) includes an automated secure pairing module 104, a graphical user interface (GUI) 106 and a UWB communication interface 108. Similarly, the second UWB device (UWB DEVICE B) includes an automated secure pairing module 114, a graphical user interface (GUI) 116 and a UWB communication interface 118. Element 120 represents an in-band UWB communication link that exists UWB communication interfaces 108 and 118 when the two UWB devices 102 and 112 when they are communication through UWB protocols and frequencies.

As indicated above, the UWB devices 102 and 112 can be any of a wide variety of devices that have UWB communication capabilities. For example, the UWB devices can be desktop computer systems, portable computer systems, personal digital assistants (PDAs), handheld computers, cellular telephones or any other desired UWB connectable device. In particular, at least one of the UWB devices will typically be a personal computer (e.g., desktop, server, portable), and at least one of the UWB devices will be a peripheral (e.g., PDA, handheld computer, printer, display, cellular telephone, etc.) UWB enabled devices will also typically have some type of display system to provide information to the user. Display systems, for example, can be text based or graphical. Many devices today provide a graphical user interface (GUI) through which users provide inputs to the device and through which information is provided to the user from the device. The GUIs 106 and 116 represent the display system through which the user is receiving information from the device.

The present invention is particularly useful for wireless personal area network (WPAN) environments where a user or group of users is using a wireless network to connect personal devices. One example is where a user may have a laptop computer, a PDA and a cellular telephone that are the electronic tools the user utilizes personally to accomplish his work and other personal tasks. It is desirable for the user to be able to share information among these personal devices over secure wireless communications, such as UWB communications, as discussed above. And it is desirable for these devices to automatically connect and communicate with each other when in range. For these UWB communications to be secure, it is desirable for these devices to be securely paired. The automated UWB secure pairing of the present invention is an efficient and advantageous way to provide this secure pairing.

The automated secure pairing modules 104 and 114 represent software modules that are processed by the UWB devices 102 and 112. These software modules operate as part of the UWB communications of the device. It is noted that the automated secure pairing modules 104 and 114 could be implemented in a variety ways, as desired, including the use of firmware or software or both. In operation, the automated secure pairing modules 104 and 114 allow for the generation of one or more pairing secrets that can be used by the UWB devices 102 and 112 to provide for identity verification and secure UWB communications.

FIG. 2 is a flow diagram 200 for secure pairing interactions between two UWB devices 102 and 112 having automated secure pairing modules according to the present invention. When a user desires to create a secure pairing between two UWB devices 102 and 112 for use in subsequent identity verification and secure communications over a UWB channel, the user first brings the two UWB devices 102 and 112 in close physical proximity. As shown in the example embodiment of FIG. 2, the first step is for the user to initiate pairing through the GUI of each device as represented by steps 202 and 222, respectively. More particularly, for the example embodiment 200 depicted in FIG. 2, pairing is initiated through the GUI of UWB Device A 102 as represented by step 202, and the UWB Device B 112 responds through its GUI that pairing is taking place as represented by step 222. Next, in steps 204 and 224, each device 102 and 112 provides feedback to the user through its GUI that secure pairing has been initiated. Next, in steps 206 and 226, each device 102 and 112 can enter low power state such that the transmit power of the device is reduced for secure pairing operations. It is noted that low power modes for pairing negotiations is an optional step. By entering low power mode, the radio-frequency energy used for wireless communications has reduced range. Therefore, it is less likely that some other wireless device can spoof or intercept the communications to generate the secure pairing. Although a low power state is not necessary, it does improve security of the subsequent pairing communications between the two devices.

At this point, the devices 102 and 112 begin in-band UWB communications as represented by element 220. In steps 208 and 228, each device 102 and 112 transmits a discovery beacon. This discovery phase 240 allows for the devices 102 and 112 to determine the existence of the other device. It is noted that only one of the devices could be configured to provide the beacon signal, if desired, such that secure pairing discovery is initiated by one of the devices. For example, USB device A 102 could be configured simply to look for a discovery beacon, and USB device B 112 could be configured to transmit a discovery beacon.

Next, after discovery phase 240, negotiation pairing stage 242 is entered. In this phase 242, the devices 102 and 112 communicate with each other through in-band UWB communications to generate secure pairing secrets for use in later UWB communications between the devices. During these operations, in steps 210 and 230, each device 102 and 112 can display feedback to the user through its GUI about the pairing activities that are taking place. It is noted that the secure pairing secrets generated by the devices 102 and 112 can utilize existing information known by the devices 102 and 112 to generate the pairing secrets. For example, information such as processor types, serial numbers, user configurations, etc. could be used to generate the pairing secrets. In this way, the user is not required to enter any keys or other passwords/codes in order to generate the secure pairing secrets that will subsequently be utilized by the devices 102 and 112.

The last phase of flow diagram 200 is the successful pairing phase 244. At this point, the devices 102 and 112 have successfully negotiated pairing secrets for use in subsequent secure UWB communications, and this negotiation has proceeded in an automated fashion without requiring user input codes. Once pairing is successful, in steps 212 and 232, each device 102 and 112 can display feedback to the user through its GUI that the pairing has been successful.

It is noted that the discovery and pairing negotiations, according to the present invention, have occurred through automated in-band UWB communications. In short, once pairing is initiated on the devices 102 and 112, the user is not required to intervene. It is again noted that secure pairing could be initiated in a variety of ways, for example, including: user initiated at both devices, automatically initiated at both devices, user initiated at one device, automatically initiated by one device when in proximity to a beacon generated by another device, and/or any other desired technique for initiating the pairing negotiations.

FIG. 3 is a flow diagram 300 for UWB communications between two ultra-wideband (UWB) devices according to the present invention. In step 302, devices are discovered using beacon communications. As noted above, this device discovery can be initiated through a variety of techniques including user initiated techniques and automated beacon techniques. In decision block 304, a determination is made concerning whether or not a pairing secret has been established between the two devices. If the answer is "yes," then flow passes to block 310 where the identity of the devices is verified using one or more pairing secrets that have previously been established between the devices, for example, using the flow diagram of FIG. 2.

If the answer in decision block 304 is "no," then flow passes to block 306. In block 306, secure pairing is negotiated over an in-band UWB communication link. In block 308, one or more pairing secrets are established based at least in part upon the in-band UWB communications. Flow then passes to block 310 where the identity of the devices is verified using the one or more pairing secrets that were established. It is noted that the in-band secure pairing negotiations can be implemented, for example, as described above with respect to FIG. 2. In FIG. 3, this is represented by the dotted line surrounding block 306 and 308 and given the element designation 200.

After verification in block 310, flow passes to decision block 312 where a determination is made whether the identity of the devices were verified. If the answer is "no," flow passes to block 314 where the device connection attempt is rejected. If the answer is "yes," flow passes to block 316 where secure UWB communications begin. It is noted that identity verification can be accomplished in a variety of ways. For example, one-way verification can be implemented where a first UWB device can verify the identity of a second UWB device (one-way trust). In addition, a two-way verification could be used where each UWB device verifies the identity of the other (no-way trust).

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for secure pairing of two or more ultra-wideband (UWB) devices, comprising:
   initiating device discovery with at least a first UWB device by entering a low power UWB transmit mode for the first UWB device and transmitting a beacon signal from the first UWB device for device discovery;
   conducting automatically secure pairing between the first UWB device and a second UWB device over in-band UWB communications;
   to automatically generate one or more pairing secrets for subsequent UWB communications between the first and second UWB devices using a key exchange protocol based upon device-known or device-generated information to generate the one or more pairing secrets;
   wherein the conducting and generating steps are conducted without requiring a visual match confirmation through graphical user interfaces (GUIs) of the first and second UWB devices.

2. The method of claim 1, further comprising also entering a low power UWB transmit mode for the second UWB device and transmitting a beacon signal from the second UWB device for device discovery.

3. The method of claim 1, wherein the initiating step is performed manually.

4. The method of claim 1, wherein the initiating step is performed automatically by the first UWB device.

5. The method of claim 1, wherein the initiating step comprises initiating a discovery phase through a graphical user interface (GUI) for the first and the second UWB devices.

6. The method of claim 1, wherein the key exchange protocol comprises at least in part upon a Diffie-Hellman key exchange protocol.

7. A secure pairing system for two or more ultra-wideband (UWB) devices, comprising:
   a first UWB device having an automated secure pairing module and a UWB communication interface, the first UWB device being configured to conduct automatically secure pairing with at least one other UWB device over in-band UWB communications without requiring a visual match confirmation through a graphical user interface (GUI); and
   a second UWB device having an automated secure pairing module and a UWB communication interface, the second UWB device being configured to conduct automatically secure pairing with at least one other UWB device over in-band UWB communications without requiring a visual match confirmation through a graphical user interface (GUI);
   wherein the first UWB device and the second UWB device are further configured to utilize at least one beacon signal transmitted in a low power UWB transmit mode for device discovery and to generate automatically one or more pairing secrets using a key exchange protocol based upon device-known or device-generated information to generate the one or more pairing secrets.

8. The secure pairing system of claim 7, wherein the first and second UWB devices are both configured to use a beacon signal transmitted in a low power UWB transmit mode for device discovery.

9. The secure pairing system of claim 7, wherein the first and second UWB devices further each comprise a graphical user interface (GUI).

10. The secure pairing system of claim 9, wherein at least the first or the second UWB device is configured to have secure pairing manually initiated through its GUI.

11. The secure pairing system of claim 9, wherein at least the first or the second UWB device is configured to initiate automatically secure pairing.

12. The secure pairing system of claim 7, wherein first and second UWB devices comprise a personal computer and a peripheral.

13. The secure pairing system of claim 7, wherein the first and second UWB devices are configured to utilize one or more pairing secrets established during secure pairing to verify identity of the UWB devices in subsequent UWB communications.

14. An ultra-wideband (UWB) device having automated in-band secure pairing, comprising:
   a UWB communication interface; and
   an automated secure pairing module configured to conduct automatically secure pairing with at least one other UWB device over in-band UWB communications without requiring a visual match confirmation through a graphical user interface (GUI);
   wherein the automated secure pairing module is further configured to use a beacon signal transmitted in low power UWB transmit mode for device discovery and to generate automatically one or more pairing secrets with the other UWB device using a key exchange protocol based upon device-known or device-generated information to generate the one or more pairing secrets.

* * * * *